(12) United States Patent
Tamai et al.

(10) Patent No.: US 6,522,120 B2
(45) Date of Patent: Feb. 18, 2003

(54) LOAD DRIVING APPARATUS

(75) Inventors: Yasuhiro Tamai, Shizuoka-ken (JP); Tetsuya Hasegawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/000,077

(22) Filed: Dec. 4, 2001

(65) Prior Publication Data

US 2002/0074986 A1 Jun. 20, 2002

(30) Foreign Application Priority Data

Dec. 14, 2000 (JP) .......................................... 2000-380394

(51) Int. Cl.[7] ................................................. H03H 7/00
(52) U.S. Cl. ........................................... 323/367; 363/60
(58) Field of Search ................................. 323/367, 907, 323/362; 363/60, 59; 219/69.13, 69.18, 69.19, 69 C

(56) References Cited

U.S. PATENT DOCUMENTS

| | | | | |
|---|---|---|---|---|
| 4,291,369 A | * | 9/1981 | Hochstrate ................... | 363/60 |
| 4,559,483 A | * | 12/1985 | Jundt et al. ................. | 318/301 |
| 5,357,082 A | * | 10/1994 | Higgins ...................... | 219/506 |

FOREIGN PATENT DOCUMENTS

| | | |
|---|---|---|
| GB | 2246253 A | 1/1992 |
| GB | 2253954 A | 9/1992 |
| GB | 2295931 A | 6/1996 |
| JP | 5-168164 | 7/1993 |
| SU | 1555699 | 4/1990 |

* cited by examiner

Primary Examiner—Rajnikant Patel
(74) Attorney, Agent, or Firm—Finnegan, Henderson, Farabow, Garrett, & Dunner, L.L.P.

(57) ABSTRACT

A load driving apparatus comprises a power supply, a load circuit, a first switch, a limiting resistor, a second switch and a controller. The power supply voltage is applied to the load circuit by the power supply, and the load is driven. The first switch is connected to the load circuit and the power supply in series, and enable or disenable the application of power supply voltage to the load circuit. The limiting resistor is connected to the load circuit in series, dividing the power supply voltage between itself and the load circuit, and thereby limiting the current supplied to the load circuit. The second switch is connected to the limiting resistor in series and to the first switch in parallel, and enable or disenable the application of power supply voltage to the load circuit and the limiting resistor. The controller opens or closes the first switch and the second switch, thereby applying power supply voltage of a plurality of values to the load circuit, and controlling the wave form of the power supply voltage.

2 Claims, 1 Drawing Sheet

LOAD DRIVING APPARATUS

BACKGROUND OF THE INVENTION

1. Field of Invention

The present invention relates to a load driving apparatus for driving the load of the electrical equipment of a vehicle: brake, heater or the like.

2. Description of Related Art

The load driving apparatus disclosed in Japanese Patent Application No. H5-168164 comprises a high-voltage battery connected in the form of loop, to a headlight, an FET, a variable duty ratio PWM control circuit, a voltage detecting circuit and a switch. The duty ratio of the variable duty ratio PWM control circuit is set so that the work load of a headlight rated 12[V] when a high-voltage power supply of 24[V] is applied becomes equal to that of a normal 12[V] power supply. Based on the duty ratio set, the FET switching is controlled, thus controlling the work load. Any change in voltage of the high-voltage power supply is detected by the voltage detecting circuit, and the duty ratio is corrected based on the detected voltage change.

In the above load driving apparatus, however, a low-voltage rated load is used without alteration in a high-voltage circuit. Therefore, a problem is encountered in the increased fluctuation amplitude of the current supplied to the load rated low-voltage and the generated noise.

SUMMARY OF THE INVENTION

Accordingly, it is a primary object of the present invention to provide a load driving apparatus capable of reducing the noise of the current supplied to the load where a low-voltage rated conventional load is driven by a high-voltage power supply.

To achieve the above object, the load driving apparatus of the present invention comprises a power supply, a load circuit, a first switch, a limiting resistor, a second switch and controller for controlling the wave form of the power supply voltage.

The power supply voltage is applied to the load circuit by a power supply, and the load is driven. The first switch is connected to the load circuit and the power supply in series, and starts or stops the application of the power supply voltage to the load circuit. The limiting resistor is connected to the load circuit in series, dividing the power supply voltage between itself and the load circuit, and thereby limiting the current supplied to the load circuit. The second switch is connected to the limiting resistor in series and connected to the first switch in parallel, and starts or stops the application of the power supply voltage to the load circuit and the limiting resistor. The controller opens or closes the first switch and the second switch, thereby applying power supply voltage of a plurality of values to the load circuit, and controlling the wave form of the power supply voltage.

According to the above structure, when the first switch is opened, the power supply voltage from the power supply is applied to the load circuit without alteration. If the first switch is closed and the second switch is opened, the divided power supply voltage is supplied to the load circuit. The state in which the power supply voltage is applied without alteration (former state) and the state in which the divided power supply voltage is applied (latter state) are repeated, thus controlling the wave form of the power supply voltage.

Controlling means shortening the period during which the second switch is opened and the first switch is closed, applying the power supply voltage divided by the limiting resistor to the load circuit, as compared with a period during which the first switch is opened, applying the power supply voltage of the power supply to the load circuit.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
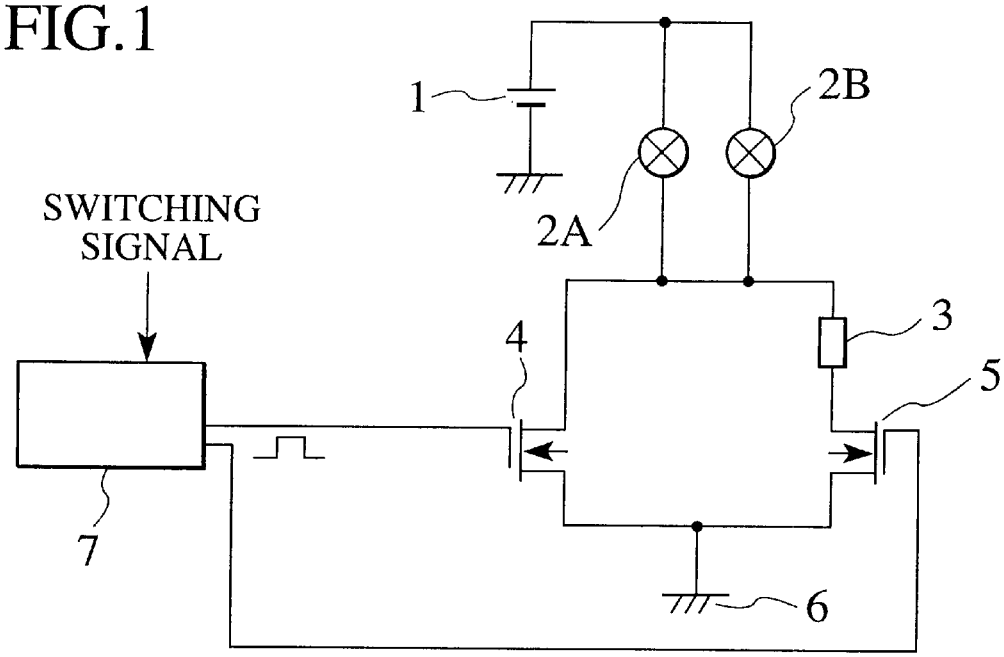
FIG. 1 is a circuit diagram showing a structure of a load driving apparatus according to an embodiment of the present invention.

An embodiment of the present invention will be explained below with reference to the drawings, wherein like numbers are designated by like reference characters.

FIG. 1 shows a load driving apparatus supplying a high voltage of 24[V] for example to a low-voltage load circuit having rating of 24[V] or lower (e.g., 12[V]).

This load driving apparatus comprises a high-voltage power supply 1; load circuits 2A and 2B (simply "load circuits 2" when referred to collectively); a first switching element 4 connected to the load circuits 2 in series; a limiting resistor 3 for limiting voltage value to be applied to load circuits 2 connected to the load circuits 2 in series; a second switching element 5 connected to the limiting resistor 3 in series; and a driver circuit (e.g., controller) 7 for opening and closing the first switching element 4 and the second switching element 5.

In the load driving apparatus, the first switching element 4 and the second switching element 5 are connected in parallel. If the first switching element 4 or the second switching element 5 are opened, voltage is applied to the load circuits 2 from the high-voltage power supply 1, and if the first switching element 4 and the second switching element 5 are closed, the application of voltage to the load circuits 2 is stopped.

The first switching element 4 comprises an FET (Field Effect Transistor), the load circuits 2 are connected to a drain terminal of the element 4, the driver circuit 7 is connected to a gate terminal of the element 4, and a grounding terminal 6 is connected to a source terminal of the element 4. A control signal from the driver circuit 7 to between the gate and source opens or closes the gate and source in this first switching element 4.

The second switching element 5 comprises an FET, the limiting resistor 3 is connected to a drain terminal of the element 5, the driver circuit 7 is connected to a gate terminal of the element 5, and the grounding terminal 6 is connected to the source terminal of the element 5. A control signal from the driver circuit 7 to between the gate and source opens or closes the gate and source in this second switching element 5.

One end of the limiting resistor 3 is connected to the load circuits 2 in series, and the other end of the limiting resistor 3 is connected to the second switching element 5. The limiting resistor 3 divides voltage from the high-voltage power supply 1 between the limiting resistor 3 and the load circuits 2. In this arrangement, the limiting resistor 3 limits the current to be supplied to the load circuits 2.

The driver circuit 7 supplies a control signal for opening or closing the first switching element 4 and the second switching element 5 to the gate terminals of the first switching element 4 and the second switching element 5 in accordance with a switch signal from outside. This driver circuit 7 stores, therein, a voltage control program and the like for controlling the voltage value applied to the load circuits 2A and 2B, and opens or closes the first switching element 4 and the second switching element 5 upon reception of the switch signal, thereby controlling the voltage applied to the load circuits 2.

[Voltage control by the driver circuit 7]

In the load driving apparatus, the limiting resistor 3 is connected to the second switching element 5 in series, the first switching element 4 and the second switching element 5 are connected to each other in parallel, and the driver circuit 7 controls the voltage applied to the load circuits 2 between three values. The driver circuit 7 opens the first switching element 4 to supply a large current to the load circuits 2, and closes the first switching element 4 and opens the second switching element 5 to supply an intermediate current to the load circuits 2, and closes the first switching element 4 and the second switching element 5 to stop the current supply to the load circuits 2.

Figure 2:
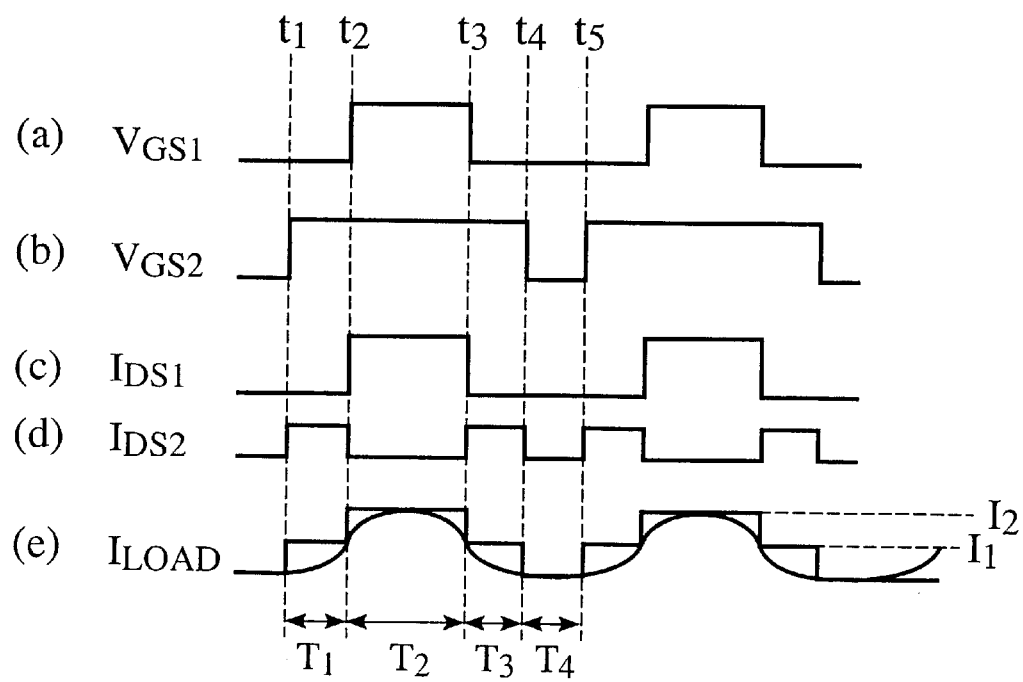
FIG. 2 is a time chart for explaining the operation of the load driving apparatus of the embodiment of the invention.

FIG. 2 is a time chart showing variation when the voltage is controlled by the driver circuit 7. In FIG. 2, (a) shows variation in voltage $V_{GS1}$ applied between the gate and the source of the first switching element 4, (b) shows variation in voltage $V_{GS2}$ applied between the gate and the source of the second switching element 5, (c) shows variation in current $I_{DS1}$ supplied between the drain and the source of the first switching element 4, (d) shows variation in current $I_{DS2}$ supplied between the drain and the source of the second switching element 5, and (e) shows variation in current $I_{LOAD}$ supplied to the load circuits 2.

According to FIG. 2, the driver circuit 7 first supplies a control signal to the second switching element 5 at time $t_1$, thereby opening the second switching element 5 (b). With this, current is supplied to the second switching element 5 (d), voltage which was divided by the limiting resistor 3 is applied to the load circuits 2, and current of first current value $I_1$ is supplied to the load circuits 2 (e) for a time period $T_1$ (time $t_1$ to time $t_2$).

At time $t_2$, the driver circuit 7 supplies a control signal to the first switching element 4, thereby opening the first switching element 4 (a). With this, current is supplied to the first switching element 4 (c), current supply to the second switching element 5 becomes negligible (d), voltage from the high-voltage power supply 1 is applied to the load circuits 2, and current of second current value $I_2$ greater than the first current $I_1$ is supplied to the load circuits 2 (e) for time period $T_2$ (time $t_2$ to time $t_3$).

At time $t_3$, the driver circuit 7 stops the supply of the control signal to the first switching element 4, thereby closing the first switching element 4 (a). With this, the current supply to the first switching element 4 is stopped (c), the current supply to the second switching element 5 is resumed (d), voltage which had been divided by the limiting resistor 3 is applied to the load circuits 2, and current of the first current value $I_1$ is supplied to the load circuits 2 (e) for time period $T_3$ (time $t_3$ to time $t_4$).

At time $t_4$, the driver circuit 7 stops the supply of control signal to the second switching element 5, thereby closing the second switching element 5 (b). With this, the current supply to the second switching element 5 is stopped (d), and the current supply is stopped (e) for time period $T_4$ (time $t_4$ to time $t_5$).

By repeating the process from time $t_1$ to $t_5$, i.e. by controlling the time periods $T_1$, $T_2$, $T_3$ and $T_4$, the driver circuit 7 controls the duty ratio and the effective value. Here, if the resistance value of the limiting resistor 3 is changed, the effective value is also changed. The time period for supplying current to the load circuits 2 is calculated from the following equation so as to obtain a predetermined effective value based on the limiting resistor 3, the high-voltage power supply 1 and the load circuits 2.

First, a target electric power $P_T$ to be consumed by the load circuits 2 is expressed as follows:

$$P_T = (V_T)^2 / R_{LOAD}$$

wherein $V_T$ is the target voltage value (e.g., 12[V]) supplied to the load circuits 2, and $R_{LOAD}$ is a resistance value (e.g., 2.4[Ω] if the load circuits are of 60[W]) of the load circuits 2.

Electric power $P_{T1}$ to $P_{T3}$ consumed by the load circuits 2 for the time periods $T_1$ to $T_3$ is as follows:

$$P_{T1} = [(R_{LOAD} \cdot (V_I)^2)/(R_{LOAD}+R_{limit})^2] \cdot [T_1/(T_1+T_2+T_3+T_4)]$$

$$P_{T2} = [(V_I)^2 / R_{LOAD}] \cdot [T_2/(T_1+T_2+T_3+T_4)]$$

$$P_{T3} = [(R_{ROAD} \cdot (V_I)^2)/(R_{LOAD}+R_{limit})^2] \cdot [T_3/(T_1+T_2+T_3+T_4)]$$

wherein, $V_I$ is a voltage of the high-voltage power supply 1 (e.g., 24[V]), and $R_{limit}$ is the resistance value of the limiting resistor 3.

In order to turn the effective value to a value equal to the electric power $P_T$, it is necessary to establish the following relation by controlling the duty ratio:

$$(V_T/V_I)^2 = [(R_{LOAD}/(R_{LOAD}+R_{limit}))^2(T_1+T_3)+T_2][1/(T_1+T_2+T_3+T_4)]$$

The driver circuit 7 determines the time periods $T_1$ to $T_3$ so as to satisfy this relation.

In this load driving apparatus, the limiting resistor 3 consumes a portion of electric power from the high-voltage power supply 1 during the time periods $T_1$ and $T_3$. With a view to electric power efficiency, it is preferable to reduce the resistance value of the limiting resistor 3, and to shorten the time periods $T_1$ and $T_3$ when the second switching element 5 is open as much as possible.

A concrete example will be described below. It is assumed that when using load circuits 2 of 60[W] at rating of 12[V], the current value to be supplied to the load circuits 2 is set to 10[A] (5[A]×2), the power supply voltage of the high-voltage power supply 1 is set to 24[V], and the resistance value of the limiting resistor 3 is set to the same value as that of the load circuits 2.

First, the second switching element 5 is opened, the power supply voltage is divided mainly between the load circuits 2 and the limiting resistor 3, and the current of 10[A] which is the same as the current of a 12[V] power supply and is about ½ of the current of a 24[V] power supply is supplied to the load circuits 2 (time period $T_1$).

If the driver circuit 7 opens the first switching element 4 when the second switching element 5 is open, since the resistance value of the path through the first switching element 4 is sufficiently lower than that of the path through the second switching element 5, a substantial portion of the current flows through the first switching element 4. Therefore a current of 20[A] is supplied to the load circuits 2(time period $T_2$).

Next, when the current supply to the load circuits 2 is stopped, the first switching element 4 is first closed and then, the second switching element 5 is closed (time period $T_3$ and $T_4$)

By repeating this process with PWM control of the first switching element 4 and the second switching element 5, current supplied to the load circuits 2 can be made into a sinusoidal wave as shown in FIG. 2(e).

When the high-voltage power supply 1 is of 24[V], the duty ratio has to be controlled to about 25[%] in order to bring the effective value of the electric power to be supplied to the load circuits 2 into one of a 12[V] power supply. To obtain the same effective value as the above case in this load driving apparatus, the ratio of the time periods $T_1$ to $T_4$ is controlled so that the value obtained by the following calculation becomes 0.25:

$$[(T_1+T_3)*(\tfrac{1}{2})^2+T_2]/(T_1+T_2+T_3+T_4)$$

For example, the duty ratio is brought to 25[%] by controlling the time periods $T_1$ and $T_3$ to 10[%] and the time period $T_2$ to 20[%], which respectively represents the ratio against the total of $T_1$, $T_2$, $T_3$ and $T_4$.

In this load driving apparatus, current supply to the load circuits 2 starts and rises in the order of a first current value $I_1$ and a second current value $I_2$, and falls and stops in the order of the second current value $I_2$ and the first current value $I_1$, and by repeating these operations, three current values can be supplied to the load circuits 2 sequentially. Therefore, with this load driving apparatus, it is possible to reduce the amount of current value change per unit time, to smoothen the current wave and thus reduce the noise of the current, as compared with a case in which two values of current are sequentially supplied to the load circuits 2.

The invention may be practiced or embodied in other ways without departing from the sprit or essential character thereof. For instance, a plurality of FETs may be connected to the load circuits 2 in parallel and voltage of three or more values may be applied. If three or more FETs are used and voltage of three or more values are applied to the load circuits 2, further smoothening of the current wave and noise reduction can be achieved.

The preferred embodiments described herein are therefore illustrative and not restrictive, the scope of the invention being indicated by the claims, and all variations which come within the meaning of claims are intended to be embraced herein.

What is claimed is:

1. A load driving apparatus, comprising:

a power supply for applying power supply voltage;

a load circuit configured to be driven by the power supply;

a first switch connected to the load circuit and the power supply in series for enabling or disenabling the application of the power supply voltage to the load circuit;

a limiting resistor connected to the load circuit in series for dividing the power supply voltage between itself and the load circuit to limit the current supplied to the load circuit;

a second switch connected to the limiting resistor in series and connected to the first switch in parallel for enabling or disenabling the application of the power supply voltage to the load circuit and the limiting resistor; and a controller for applying power supply voltage of a plurality of values to the load circuit by opening or closing the first switch and the second switch, thereby controlling a wave form of the power supply voltage supplied to the load circuit.

2. A load driving apparatus according to claim 1, wherein the controller shortens a period during which the second switch is opened and the first switch is closed to apply power supply voltage divided by the limiting resistor to the load circuit, as compared with a period during which the first switch is opened to apply the power supply voltage of the power supply to the load circuit.

* * * * *